United States Patent
Negulescu et al.

(10) Patent No.: US 7,121,797 B2
(45) Date of Patent: Oct. 17, 2006

(54) COOLED TURBINE ROTOR WHEEL, IN PARTICULAR, A HIGH-PRESSURE TURBINE ROTOR WHEEL FOR AN AIRCRAFT ENGINE

(75) Inventors: Dimitrie Negulescu, Berlin (DE); Stephan Lisiewicz, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 108 days.

(21) Appl. No.: 10/887,094

(22) Filed: Jul. 9, 2004

(65) Prior Publication Data
US 2005/0111980 A1    May 26, 2005

(30) Foreign Application Priority Data
Jul. 11, 2003    (DE) ................. 103 32 561

(51) Int. Cl.
*F01D 5/18*    (2006.01)
(52) U.S. Cl. ................. 416/97 R; 416/193 A; 416/248
(58) Field of Classification Search ............. 416/95, 416/96 R, 97 R, 193 A, 219 R, 248
See application file for complete search history.

(56) References Cited

U.S. PATENT DOCUMENTS

| | | | | |
|---|---|---|---|---|
| 3,834,831 A | | 9/1974 | Mitchell | |
| 5,340,278 A | * | 8/1994 | Magowan | 416/96 R |
| 6,017,189 A | * | 1/2000 | Judet et al. | 416/97 R |
| 6,457,935 B1 | | 10/2002 | Antunes et al. | |

FOREIGN PATENT DOCUMENTS

DE    69805669    1/2000

OTHER PUBLICATIONS

German Search Report dated Jul. 11, 2003.

* cited by examiner

*Primary Examiner*—Richard A. Edgar
(74) *Attorney, Agent, or Firm*—Timothy J. Klima

(57) ABSTRACT

On a high-pressure turbine rotor wheel, where a blade neck interspace (14) exists between two adjacent turbine blades (4) which is defined by the disk lobe (2) and the opposite blade necks (5) and blade platforms (6), part of the air supplied by the high-pressure cooling channel (9) is passed via a diverter cooling channel (10) into the blade neck interspace (14) to effectively cool the blades and the disk rim (1) in this area and to simultaneously supply the low-pressure channels (12) with cooler air and displace the hot sealing air. Thus, the life of the turbine rotor wheel is increased with simple means.

13 Claims, 1 Drawing Sheet

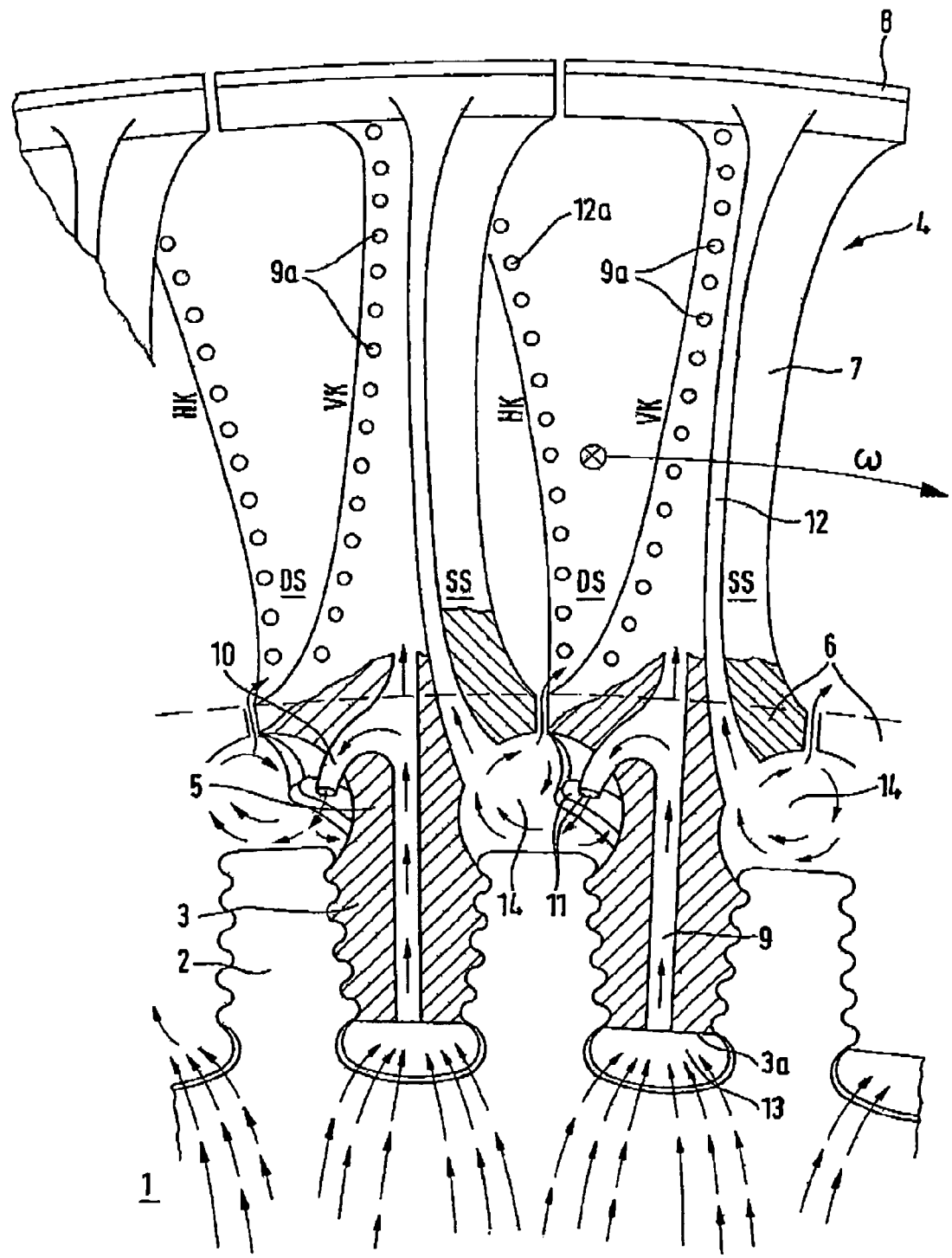

COOLED TURBINE ROTOR WHEEL, IN PARTICULAR, A HIGH-PRESSURE TURBINE ROTOR WHEEL FOR AN AIRCRAFT ENGINE

This application claims priority to German Patent Application DE10332561.1, filed Jul. 11, 2003, the entirety of which is incorporated by reference herein.

BACKGROUND OF THE INVENTION

The present invention relates to a cooled turbine rotor wheel, and in particular, a high-pressure turbine rotor wheel for an aircraft engine.

Turbine performance largely depends on the turbine entry temperature of the working medium. The level of this temperature is, however, limited by the thermal loadability of the material of the turbine rotor blades. Therefore, the turbine rotor blades must be cooled as effectively as possible in order to minimize their thermal load and ensure maximum life. The high-pressure blades of a turbine rotor wheel usually possess internal cooling channels. For the cooling of the rotor blades, high-pressure cooling air is fed to the turbine rotor wheel through high-pressure cooling channels originating at the blade root. To provide a seal against the hot-gas duct downstream of the stator, so-called sealing air is used which also flows the disk rim and the interspace between either of the adjacent blade necks of the turbine rotor blades and which is fed through low-pressure channels originating at the blade neck to cool the blade shrouds or other blade areas with lower supply pressure requirement. The temperature of the sealing air is, however, so high that, in particular, the disk rim of the turbine rotor wheel, but also the blade platform and the blade neck, are subject to such a thermal load that the life of the turbine rotor wheel, which comprises the disk and the rotor blades, is considerably reduced.

In a cooling system for a turbine blade disclosed in Specification U.S. Pat. No. 3,834,831, a perforated cooling chamber, which is supplied with cooling air, is situated in a cavity provided in a blade neck and in the interspace between either of the blade necks of adjacent turbine rotor blades. The cooling air passes through the perforation to the inner walls of the blade neck and radially flows through the blade via cooling channels originating at the cavity in the blade neck. The cooling air supplied separately via the perforated cooling chamber situated between the blade necks cools the outer side of the blade necks as well as the free periphery of the disk rim and leaves the interspace via a gap between the adjacent blade platforms. This cooling system for a turbine rotor wheel is, however, disadvantageous in that the plurality of cooling-air supplied cooling chambers situated on the disk periphery and in the cavities of the blade necks requires considerable investment.

BRIEF SUMMARY OF THE INVENTION

A broad aspect of the present invention is to provide a high-pressure turbine rotor wheel for an aircraft engine which, while involving minimum investment, ensures effective cooling of the blades and the disk rim and, thus, a long service life of the turbine rotor wheel.

It is a particular object of the present invention to provide solution to the above problems by a turbine rotor wheel designed in accordance with the features described herein. Further features and useful and advantageous embodiments of the present invention will become apparent from the description below.

The essential feature of the present invention is a diverter cooling channel which branches off from the at least one high-pressure cooling channel extending in the interior of the turbine blade and supplying high-pressure cooling air for the cooling of the blade airfoil, this diverter cooling channel issuing into the blade neck interspace between either of the adjacent turbine blades. The idea underlying this measure, which requires minimum design effort, is to use part of the high-pressure cooling air immediately for the cooling of the blade neck interspace, in particular the disk lobe of the turbine rotor wheel, and to simultaneously displace the hot sealing air from these areas of the turbine blade. Thus, cooling of the turbine rotor wheel is improved and, in consequence, the thermal load of the material reduced, considerably increasing the life of disk and rotor blades.

The at least one outlet of the at least one diverter cooling channel features impingement nozzles which are preferably directed immediately onto the surface of the disk lobe, cooling the disk lobe intensively by way of impingement. The low-pressure cooling channel, which extends from the blade neck interspace between two adjacent turbine blades, is also supplied with the cooling air present in the blade neck interspace, this air being less hot than the normally used sealing air. Thus, efficient cooling is provided also for those areas of the blades which require less supply pressure than the areas supplied via the high-pressure air channel. These measures further increase service life.

BRIEF DESCRIPTION OF THE DRAWING

The present invention is more fully described in the light of the accompanying drawing showing a preferred embodiment, with the single FIGURE showing, in partially sectional front view, a turbine rotor wheel in the area of the blades.

DETAILED DESCRIPTION OF THE INVENTION

The turbine rotor wheel comprises a disk rim 1 with peripheral disk lobes 2. A turbine blade 4 is fitted, with its blade root 3, to each of the spaces between the disk lobes 2. The blade root 3 extends, in this sequence, into the blade neck 5, the blade platform 6, the blade airfoil 7 with leading edge and trailing edge VK, HK as well as pressure side and suction side DS, SS, and, finally, the blade shroud 8. The opposite blade necks 5 and blade platforms 6 as well as the top surface of the disk lobe 2 on the periphery of the disk rim 1 define a blade neck interspace 14. Arrow ω indicates the direction of rotation of the turbine rotor wheel. In the interior of the turbine blade 4, at least one high-pressure cooling channel 9 is provided which originates at the bottom 3*a* of the blade root 3 and leads, via a plurality of cross-channels whose mouths are indicated by the reference numeral 9*a*, to the highly thermally loaded areas of the blade airfoil 7, for example the leading edge VK. Additionally, a diverter cooling channel 10 branches off from the high-pressure cooling channel 9 approximately at the level of the blade platform 6 which issues into the blade neck interspace 14 on the pressure side DS of the blade neck 5. The pressure-side air-exit impingement nozzles 11 of the diverter cooling channel 10 are directed onto the periphery of the disk rim 1, i.e. the free top surface of the respective disk lobe 2. Furthermore, at least one low-pressure cooling channel 12 is provided in the interior of the turbine blade 4 which leads to the areas of the turbine blade 4 which have low supply pressure requirement, here the blade shroud 8, and which originates at the side opposite to the air-exit impingement nozzles 11, i.e. the suction side SS of the blade neck 5 of the adjacent turbine blade 4.

The cooling system described in the above has the following function:

A high-pressure cooling airflow flows into the high-pressure cooling channel 9 via a supply channel 13 left beneath the blade root 3 and between the disk lobes 2. This cooling airflow is divided into a first and a second partial cooling airflow in the area of the diverter cooling channel 10. The first partial cooling airflow is passed into the blade airfoil 7 and back to the outside via the cross channels and their cross-channel mouths 9a in the hot blade airfoil areas to be cooled at the blade leading edge VK. The second partial cooling airflow is passed via the diverter cooling channel 10 and the air-exit impingement nozzles 11 directly onto the free top surface of the disk lobe 2 to initially provide highly efficient impingement cooling in this area and additionally to cool the pressure-side area of the blade neck 5 and the blade platform 6 as well as the suction-side area of the blade neck 5 and the blade platform 6 of either of the adjacent turbine blades. Finally, part of the cooling air branched off via the diverter cooling channel 10 is passed into the low-pressure cooling channel 12 to supply with cooling air, and correspondingly cool, those areas of the turbine blade 4 which have a lower supply pressure requirement, for example the blade shroud 8 or the trailing edge HK of the blade airfoil 7. A further part of the cooling air introduced into the blade neck interspace 14 discharges via a gap left between the adjacent blade platforms 6.

Introduction of part of the high-pressure cooling air into the blade neck interspace 14 displaces the hot sealing air which is normally present in this area, thus preventing the hot sealing air from loading the respective areas of the turbine blade 4 or the disk rim 1, respectively. Nor is it used as cooling air for the low-pressure cooling channels 12. By diversion and introduction of a secondary high-pressure airflow into the blade neck interspace 14, cooling of the respective disk lobes 2, blade necks 5 and blade platforms 6 as well as of the blade areas covered by the low-pressure cooling channels 12 and their respective associated cross-channels with mouths 12a is improved with minimum design effort and, in consequence, the life of the turbine rotor wheel increased.

LIST OF REFERENCE NUMERALS

1 Disk rim
2 Disk lobe
3 Blade root
3a Bottom of 3
4 Turbine blade
5 Blade neck
6 Blade platform
7 Blade airfoil
8 Blade shroud
9 High-pressure cooling channel
9a Mouth of cross channels of 9
10 Diverter cooling channel
11 Air-exit impingement nozzles
12 Low-pressure cooling channel
12a Mouth of cross channels of 12
13 Supply channel
14 Blade neck interspace
VK Leading edge of 7
HK Trailing edge of 7
DS Pressure side
SS Suction side
ω Direction of rotation of turbine rotor wheel

What is claimed is:

1. A turbine blade constructed and arranged for radial attachment to a periphery of a turbine disk rim having a plurality of disk lobes for positioning between adjacent turbine blades, the turbine blade including a blade neck and blade platform constructed and arranged to form, with an adjacent turbine blade and an interspersed disk lobe, a blade neck interspace, the turbine blade including at least one high pressure cooling channel for internal cooling by high-pressure cooling air, and a diverter cooling channel connected to the high-pressure cooling channel for directing a portion of the high pressure cooling air into the blade neck interspace; and further comprising at least one low-pressure cooling channel in the turbine blade which originates at the blade neck interspace.

2. A turbine blade in accordance with claim 1, wherein the diverter cooling channel directs the high pressure cooling air immediately onto the disk lobe to provide for impingement cooling in the blade neck interspace.

3. A turbine blade in accordance with claim 2, wherein a mouth of the diverter cooling channel forms at least one air-exit impingement nozzle.

4. A turbine blade in accordance with claim 3, wherein the at least one low-pressure channel originates at a side of the turbine blade opposite to the diverter cooling channel.

5. A cooled turbine rotor wheel, comprising: a plurality of turbine blades radially arranged at a periphery of a disk rim, with a disk lobe and blade necks and blade platforms of opposing turbine blades adjacent the disk lobe defining a blade neck interspace, each turbine blade including at least one high pressure cooling channel for internal cooling by high-pressure cooling air, and a diverter cooling channel connected to the high-pressure cooling channel for directing a portion of the high pressure cooling air into the blade neck interspace; and further comprising at least one low-pressure cooling channel in the turbine blade which originates at the blade neck interspace.

6. A cooled turbine rotor wheel in accordance with claim 5, wherein the diverter cooling channel directs the high pressure cooling air immediately onto the disk lobe to provide for impingement cooling in the blade neck interspace.

7. A cooled turbine rotor wheel in accordance with claim 6, wherein a mouth of the diverter cooling channel forms at least one air-exit impingement nozzle.

8. A cooled turbine rotor wheel in accordance with claim 7, wherein the at least one low-pressure channel originates at a side of the turbine blade opposite to the diverter cooling channel.

9. A cooled turbine rotor wheel in accordance with claim 8, wherein the diverter cooling channel issues on a pressure side of the blade and the low-pressure cooling channel originates on a suction side of the blade at adjacent blade neck interspaces.

10. A cooled turbine rotor wheel in accordance with claim 9, wherein the mouth of the diverter cooling channel forms a plurality of air-exit impingement nozzles.

11. A cooled turbine rotor wheel in accordance with claim 7, wherein the mouth of the diverter cooling channel forms a plurality of air-exit impingement nozzles.

12. A cooled turbine rotor wheel in accordance with claim 1, wherein the at least one low-pressure channel originates at a side of the turbine blade opposite to the diverter cooling channel.

13. A cooled turbine rotor wheel in accordance with claim 12, wherein the diverter cooling channel issues on a pressure side of the blade and the low-pressure cooling channel originates on a suction side of the blade at adjacent blade neck interspaces.

* * * * *